United States Patent [19]

Leithem et al.

[11] 4,162,359

[45] Jul. 24, 1979

[54] PRODUCTION OF CELLULOSE ACETATE

[75] Inventors: Phyllis C. Leithem, McCleary; Romeo Conca, Shelton, both of Wash.

[73] Assignee: International Telephone and Telegraph Corporation, New York, N.Y.

[21] Appl. No.: 886,285

[22] Filed: Mar. 13, 1978

[51] Int. Cl.$^2$ .......................... C08B 1/02; C08B 3/06
[52] U.S. Cl. ........................................ 536/70; 536/69
[58] Field of Search ................................... 536/69, 70

[56] References Cited

U.S. PATENT DOCUMENTS

| 1,379,699 | 5/1921 | Scheele | 536/69 |
| 1,749,003 | 3/1930 | Schur et al. | 536/70 |
| 3,038,894 | 6/1962 | Thomsen | 536/70 |

FOREIGN PATENT DOCUMENTS

| 282794 | 6/1929 | United Kingdom | 536/70 |
| 338745 | 11/1930 | United Kingdom | 536/70 |
| 343655 | 2/1931 | United Kingdom | 536/69 |

Primary Examiner—Ronald W. Griffin
Attorney, Agent, or Firm—J. B. Raden; H. J. Holt

[57] ABSTRACT

Cellulose acetate is produced by subjecting highly purified cellulosic dissolving pulp to a bleaching sequence including at least one alkaline extraction stage and acetylating the bleached pulp to convert the pulp to cellulose acetate. The yellowness index of the cellulose acetate is reduced by carrying out the alkaline extraction stage in the presence of from 0.2 to 3.3%, based on dry pulp weight, of sodium or hydrogen peroxide.

7 Claims, No Drawings

PRODUCTION OF CELLULOSE ACETATE

This invention relates to the production of cellulose acetate and more specifically to a bleaching sequence for the production of cellulose acetate of improved quality.

The bleaching stages of a pulping operation impart the desired final characteristics to the pulp, of which brightness or whiteness is quite important. Cellulose acetate is produced from a highly purified grade of dissolving pulp and the bleaching stages are of particular criticality to the properties of the final cellulose acetate product.

Peroxides have been widely used in the bleaching of high yield pulps and waste paper to provide substantial brightness gains. Recently, the literature has disclosed that the use of hydrogen peroxide as an additive in the extraction stages of chemical pulps improves such properties as pulp brightness and brightness stability. However, in the case of high purified grades of dissolving pulp, such as those used for producing cellulose acetate, the addition of peroxide to the extraction stage shows either small or no improvement in pulp brightness and essentially no change in pulp brightness stability. There are a number of routes to increase in pulp brightness, most of which have little or no correlation with cellulose acetate quality. Pulp brightness is a measure of pulp reflectance related to an arbitrary standard rather than an absolute characterization of the pulp chemically. On the other hand, the quality of cellulose acetate depends very much on the nature of the cellulose molecule that is subjected to an acetylation reaction.

A principal object of the present invention is the provision of a process for producing cellulose acetate of improved quality.

An additional object of this invention is to provide a bleaching sequence capable of producing such improved quality cellulose acetate which sequence involves the same or fewer bleaching stages than prior processes and which involves no additional bleaching equipment.

The foregoing and other objects of the invention are achieved by carrying out the alkaline extraction stage of the bleaching sequence in the presence of from 0.2 to 3.3%, based on dry pulp weight, of a peroxide selected from the group consisting of hydrogen peroxide and sodium peroxide. The use of such a bleaching stage has been found to reduce the "yellowness index" of the resulting cellulose acetate. Yellowness index is a widely used measurement of cellulose acetate product quality—the lower the level of yellowness index, the higher the quality. This improved result was particularly surprising because the bleaching sequence was found to provide little or no improvement in pulp brightness or brightness stability for the acetate grade pulps. In effect, the peroxide-extraction bleaching of acetate grade pulp results in selective improvement in the color of acetate products made from the pulp.

The conditions of the extraction stage to which peroxide is added are determined by the functions of the extraction stage in the bleach sequence for a particular grade and are not altered to accommodate the use of peroxide on the basis of the known properties of the peroxide. For example, extraction stages in bleach sequences are generally of quite alkaline pH—initial pH 11-13 to a final pH of 10-12. To be effective in bleaching wood pulp, hydrogen peroxide must be used under alkaline conditions. However, the optimum pH to avoid excessive $H_2O_2$ decomposition loss to $O_2$ and effectively bleach pulp is between 9.5 and 10.5 The amount of caustic addition based on oven dry pulp which would give a pulp slurry pH of 9.5-10.5 is much lower than that required to perform the various functions of most types of extraction stages. Thus, peroxide must be used under conditions suitable for concurrent alkaline extraction determined by grade type and position in the bleaching sequence, rather than simply by substituting a comparatively less alkaline traditional peroxide bleaching stage which may utilize an amount of base insufficient to accomplish the extraction stage functions.

In general, the alkaline extraction stage will be carried out under the following conditions:

| | |
|---|---|
| Caustic Weight (%) (based on dry pulp) | 0.3-14 |
| °C. | 50-145 |
| Time (Hrs) | 0.5-2.0 |
| Consistency (% dry pulp of total wt) | 8-16 |
| pH (initial) | 11-13 |
| pH (final) | >10 |

At extraction temperatures below 100° C., final pH's should normally be greater than 11.

The extraction stage is normally intended to remove lignin and, in the case of sulfite pulps, hemicellulose. The addition of peroxide to an extraction stage results in improved acetate properties without impairing the lignin dissolution and hemicellulose removal functions of the basic extraction stage. In effect, $H_2O_2$ inclusion in an extraction stage does not require reaction conditions, especially pH, to be altered. The actual final pH and the $H_2O_2$ and NaOH amounts are typically dependent on the chemical additions and temperature for the pulp grade, the position of the extraction stage in the bleach sequence and on the type of stage, if any, which preceded the extraction stage. Normally relatively large amounts of $H_2O_2$ are consumed.

The cellulose acetate evaluations set forth herein were made by acetylating pulp in an acid catalyzed acetic acid-water esterification until a triacetate product was obtained and then hydrolyzing to the diacetate or conventional cellulose acetate. The acetylation process was either low catalyst or high catalyst and used $H_2SO_4$ as the catalyst at about 1.5% and 14% addition, respectively, based on pulp. The diacetate flake would normally be further processed into acetate yarn, cigarette tow or plastics. However, it has been found that the color of a dispersion of the diacetate flake in methylene chloride and methanol as measured by a colorimeter gives an accurate indication of the equivalent yellowness index of the acetate yarn or tow. In the case of cellulose acetate plastics, the diacetate flake is injection molded into a disk and the yellowness index of the disk is measured. An additional measure of color used in the acetate industry is the so-called "+b" color. This is a measure of one of the three color components that make up the yellowness index. All of the color measurements set forth herein are made in accordance with a standard procedure, namely ASTM D1925-70.

The use of peroxide-extraction is very versatile and is not limited by furnish, type of cooking, pulp grade, or position of the stage in the bleach sequence. The process of the invention is similarly not limited by the type of cooking to which the pulp has been subjected, although the cooking process must be capable of producing pulp of dissolving grade quality suitable for conversion into cellulose acetate derivatives. Unbleached pulps that have been successfully used include both ammonium and sodium base sulfite and steam prehydrolyzed kraft cooked stocks. Wood furnishes used have included western hemlock, a black spruce and balsam fir mix, southern pine and a southern hardwood mix. Bleached dissolving grade pulps used in cellulose acetate end-use are highly refined in comparison to pulps intended for paper end-use. However, a range of refinement does exist from marginal to high quality pulp suitable for cellulose acetate end-use, from which several types of cellulose acetate products are made including acetate yarn, cigarette filter tow, and acetate plastics. Generally speaking, the lower the pulp solubility in 18% sodium hydroxide ($S_{18}$) the more highly refined the pulp and the better the quality for an acetate end-use application. Data has been obtained using peroxide-extraction bleaching for a variety of pulp grades applicable to the major cellulose acetate end-uses, i.e. yarn, filter tow and plastics.

In the discussion which follows, the various stages of the bleaching sequences will be identified by their abbreviations in accordance with well understood industry practice. Such abbreviations are, for example, set out in *Pulping Processes*, Rydholm, Interscience Publishers, 1965 at pgs. 1061-1080. Unless otherwise indicated herein, the various stages are identified as set out in the Rydholm text and reference should be made to that text for a more complete explanation of the stages. The combination peroxide-extraction stage of the invention will be identified as $E_P$ for an atmospheric pressure extraction stage with peroxide or $E_P^o$ for a pressure extraction stage with peroxide. The remaining stages are identified as follows:

C = chlorination
E = alkali extraction
H = hypochlorite oxidation
D = chlorine dioxide oxidation
P = sodium or hydrogen peroxide oxidation
X = cold caustic extraction The cold caustic extraction stage (X) is a relatively new purification stage for dissolving pulp and is described, for example, in *The Bleaching of Pulp*, W. Howard Rapson, TAPPI Monograph Series No. 27, 1963 (pgs 81-91). The abbreviation $C_D$ is a mixed chlorination and chlorine dioxide stage.

As an indication of the general applicability of a peroxide-extraction stage in the bleaching of dissolving pulp intended for cellulose acetate end-use, a variety of basic bleach sequences have been used. These include primary chlorination, mixed chlorine and chlorine dioxide primary treatments, primary chlorine dioxide sequences, and primary hot caustic extraction sequences. Among the specific bleaching sequences with which the invention is useful are $CE°_PCHD$, $CE°CE_PD$, $CE_PDED$, $CE_PDXD$, $CHE_PDXD$, $DE_PDH$, $ECE_PD$ and $ECE_PDX$. Other sequences will be readily apparent to those skilled in the art.

The following examples illustrate the practice of the invention. Unless otherwise indicated, all parts and percentages are by weight.

EXAMPLE 1

An ammonia base acid sulfite unbleached stock was produced at about 5% lignin content and at 9.2 dl/g (deciliters per gram) cupriethylenediamine intrinsic viscosity from a predominantly western hemlock chip furnish. Unbleached pulp was bleached by a control five stage $CE°CHD$ sequence and by an experimental sequence in which 0.5-1.0% $H_2O_2$ [O.D. (oven dry) pulp basis] had been included in the 140° C. pressure second stage hot caustic extraction to produce bleached pulp suitable for acetate yarn applications. Conditions in the chlorination, hypochlorite, and chlorine dioxide stages of bleaching were held constant. The brightness of pulps bleached using peroxide-extraction were the same to about 1.0% higher in brightness. Brightness stability as measured by a ratio following heat-aging and ultraviolet aging of pulp remained unchanged by the peroxide inclusion (a difference of 0.1 unit in the index is not significant). The pulp samples were acetylated on a semi-works scale in a low catalyst (1.87% $H_2SO_4$ on pulp) acetic acid-water esterification until the triacetate product was obtained. The triacetate was hydrolyzed to the diacetate product and precipitated as diacetate flake. The yellowness index of a dispersion of the diacetate flake in a methylene chloride: methanol solution ($MeCl_2$:MeOH YI) was read using a Hunter colorimeter as representative of the color of the chopped acetate yarn which could ultimately be spun from the diacetate flake. Lower $MeCl_2$:MeOH YI values are desirable as indicative of better quality, less yellow acetate yarn. However, $MeCl_2$:MeOH YI data correlated poorly as a function of pulp brightness (least squares data fit simple linear regression correlation coefficient $r = -0.65$, $n = 5$, $x =$ pulp ELB, $y = MeCl_2$:MeOH YI). The following table compares a series of pulps prepared in accordance with a known bleaching sequence with a series of additional pulps differing essentially only in the substitution of an $E_p°$ stage for an E° stage. In the table, K number is an approximate measure of the lignin content of unbleached pulp as measured by reaction with permanganate. The K number divided by five is approximately the percentage of lignin by weight in the oven dry pulp. In the table, $R_{10}$ (%) is a measure of pulp purity—the percentage of pulp which does not dissolve in 10% caustic. Dissolving pulps are typically over 90% and usually 92% or higher in $R_{10}$.

TABLE I

| Sample Number | 1 | 2 | 3 | 4 | 5 |
|---|---|---|---|---|---|
| Bleach Sequence | | CE°CHD | | | |
| K Number | | 23 | | | |
| Unbleached I.V.,dl/g | | 9.2 | | CE$_P$°CHD | |
| Peroxide-Hot Caustic Extraction | | | | | |
| H$_2$O$_2$ added, % (O.D. pulp basis) | 0.0 | 0.0 | 0.5 | 1.0 | 1.0 |
| H$_2$O$_2$ consumed, % (O.D. pulp basis) | 0.0 | 0.0 | 0.5 | 1.0 | 1.0 |
| MgSO$_4$ added, % (O.D. pulp basis) | 0.0 | 0.0 | 0.1 | 0.15 | 0.0 |
| NaOH added, % (O.D. pulp basis) | 11.5 | 11.5 | 11.5 | 11.5 | 12.5 |
| Time, H:M | 0:55 | 0:55 | 0:55 | 0:55 | 0:55 |
| Temperature, °C. | 140 | 140 | 140 | 140 | 140 |
| pH (final) | 10.1 | 10.0 | 9.6 | 9.4 | 11.1 |

TABLE I-continued

| Sample Number | 1 | 2 | 3 | 4 | 5 |
|---|---|---|---|---|---|
| Bleach Sequence | | CE*CHD | | | |
| K Number | | 23 | | | |
| Unbleached I.V.,dl/g | | 9.2 | | CE$_P$*CHD | |
| Percent O.D. | 14 | 14 | 14 | 14 | 14 |
| Analytical Data | | | | | |
| $R_{10}$, % | 93.7 | 93.7 | 93.5 | 93.3 | 93.3 |
| $S_{18}$, % | 3.2 | 3.2 | 3.4 | 3.5 | 3.1 |
| Bleached I.v., dl/g | 8.0 | 8.5 | 8.2 | 7.8 | 7.7 |
| ELB[1], % | 93.3 | 92.9 | 93.4 | 93.8 | 94.4 |
| BSI[2] | | | | | |
| (a) Heat-aged | 0.2 | 0.2 | 0.2 | 0.2 | 0.1 |
| (b) Ultraviolet-aged | 0.7 | 0.7 | 0.7 | 0.6 | 0.5 |
| Diacetate | | | | | |
| MeCl$_2$:MeOH YI, Hunter | 17.2 | 16.0 | 14.4 | 14.3 | 14.4 |

[1] ELB is Elrepho Brightness
[2] BSI is brightness stability index

EXAMPLE 2

An ammonia base acid sulfite stock was cooked from a mixed black spruce and balsam fir chip furnish. The unbleached stock was bleached by control DEDH and experimental DE$_P$DH sequences for acetate yarn enduse. The inclusion of 0.8% H$_2$O$_2$ in the second stage hot caustic extraction resulted in somewhat higher brightness pulp but with no improvement in brightness stability index after heat-aging or ultraviolet aging. Conditions in the chlorine dioxide and hypochlorite stages were held constant. The MeCl$_2$:MeOH yellowness index of the diacetate dispersions subsequent to Baker-Perkins low catalyst acetylation was reduced for the peroxide-extraction bleached sample. Table II sets forth the parameters of the two bleaching sequences and the comparative results obtained.

TABLE II

| Sample No. | 1 | 2 |
|---|---|---|
| Bleach Seqence | | DEDE$_P$ |
| K Number | | 9 |
| Unbleached I.V., dl/g | | 8.7 |
| Hot Caustic Extraction or Peroxide-Hot Caustic Extraction | | |
| (0.05% MgSO$_4$ added with H$_2$O$_2$) | | |
| H$_2$O$_2$ added, % (O.D. pulp basis) | 0.0 | 0.8 |
| H$_2$O$_2$ consumed, % (O.D. pulp basis) | 0.0 | 0.8 |
| NaOH added, % (O.D. pulp basis) | 6.0 | 6.2 |
| Time, H:M | 1:30 | 1:30 |
| Temperature, °C | 102 | 102 |
| pH (Final) | 10.6 | 10.6 |
| Percent O.D. | 12 | 12 |
| Analytical Data | | |
| $R_{10}$, % | 92.2 | 91.8 |
| $S_{18}$, % | 4.6 | 5.1 |
| Brightness Stability Index | | |
| (a) Heat-aged | 0.1 | 0.1 |
| (b) Ultraviolet-aged | 0.6 | 0.5 |
| Diacetate | | |
| MeCl$_2$:MeOH YI Hunter | 19.7 | 18.6 |

EXAMPLE 3

In this example, a comparison was made between two bleaching sequences, both of which contained a final peroxide-extraction stage in accordance with the invention. However, one of the sequences included an additional peroxide-extraction stage as the 2nd stage of the sequence. The furnish and cooking for all samples were similar to Example 2. Specifically, an ammonia base acid sulfite cook was made from a black spruce and balsam fir furnish. This stock was bleached for acetate yarn end-use using a DEDE$_P$ sequence. Experimental variation included the addition of 0.2–0.8% H$_2$O$_2$, O.D. pulp basis, in the second stage hot caustic extraction. For these samples, MeCl$_2$:MeOH YI for diacetate dispersion following low catalyst Baker—Perkins acetylation of the pulp and pulp brightness both show excellent separate linear correlation as functions of hydrogen peroxide consumption in the peroxide-extraction stage (least squares data fit simple linear regression correlation coefficients of −0.95 and +0.97, respectively). The data for this example are set forth in Table III.

TABLE III

| Sample No. | 1 | 2 | 3 | 4 | 5 |
|---|---|---|---|---|---|
| Bleach Sequence | DEDE$_P$ | | DE$_P$DE$_P$ | | |
| K Number | 6 | | | | |
| Unbleached I.V., dl/g | 9.7 | | | | |
| Hot Caustic Extraction or Peroxide-Hot Caustic Extraction | | | | | |
| (0.05% MgSO$_4$ added with H$_2$O$_2$) | | | | | |
| H$_2$O$_2$ added, % (O.D. pulp basis) | 0.0 | 0.2 | 0.4 | 0.6 | 0.8 |
| H$_2$O$_2$ consumed, % (O.D. pulp basis) | 0.0 | 0.2 | 0.4 | 0.6 | 0.8 |
| NaOH added, % (O.D. pulp basis) | 6.4 | 6.45 | 6.5 | 6.55 | 6.6 |
| Time, H:M | 1:30 | 1:30 | 1:30 | 1:30 | 1:30 |
| Temperature, °C. | 104 | 104 | 104 | 104 | 104 |
| pH (Final) | 10.7 | 11.1 | 10.9 | 11.1 | 11.1 |
| Percent O.D. | 12 | 12 | 12 | 12 | 12 |
| Analytical Data | | | | | |
| $R_{10}$, % | 92.8 | 92.4 | 92.7 | 92.3 | 91.4 |
| $S_{18}$, % | 4.6 | 4.7 | 4.8 | 4.8 | 5.3 |
| Bleached I.V., dl/g | 8.3 | 8.0 | 8.4 | 8.0 | 7.6 |
| ELB, % | 96.6 | 96.4 | 96.8 | 96.9 | 97.4 |
| Brightness Stability Index | | | | | |
| (a) Heat-aged | 0.1 | 0.1 | 0.1 | 0.1 | 0.1 |

TABLE III-continued

| | | | | | |
|---|---|---|---|---|---|
| (b) Ultraviolet-aged Diacetate | 0.4 | 0.5 | 0.5 | 0.5 | 0.5 |
| MeCl$_2$:MeOH YI, Hunter | — | 17.7 | 17.0 | 16.9 | 15.7 |

EXAMPLE 4

A dissolving grade steam prehydrolyzed kraft cook of a mixed southern hardwoods furnish was bleached for acetate cigarette filter tow and acetate yarn applications by control CHEDXD and experimental CHF$_P$DXD sequences. Fully bleached pulp brightness was equivalent and, in one case reduced, following inclusion of 0.2–0.3% H$_2$O$_2$ (O.D. pulp basis) in the third stage hot caustic extraction. Brightness stability was unaffected. However, after high-catalyst acetylation of the pulp, diacetate dispersion MeCl$_2$:MeOH YI was actually better for the lower brightness peroxide-extraction bleached pulps (least squares data fit simple linear regression correlation coefficient r= +0.48, n=4). A flake disk +b color was also read using the Hunter colorimeter on disks pressed from the diacetate flakes. Data for this example are set forth below.

TABLE IV

| Sample No. | 1 | 2 | 3 | 4 |
|---|---|---|---|---|
| Bleach Sequence | CHEDXD | | CHE$_P$DXD | |
| K Number | 9 | | | |
| Unbleached I.V., dl/g | 7.7 | | | |
| Hot Caustic Extraction or Peroxide-Hot Caustic Extraction (0.05% MgSO$_4$ added with H$_2$O$_2$) | | | | |
| H$_2$O$_2$ added, % (O.D. pulp basis) | 0.0 | 0.0 | 0.2 | 0.3 |
| H$_2$O$_2$ consumed, % (O.D. pulp basis) | 0.0 | 0.0 | 0.2 | 0.3 |
| NaOH added, % (O.D. pulp basis) | 1.5 | 1.5 | 1.5 | 1.5 |
| Time, H:M | 1:15 | 1:15 | 1:15 | 1:15 |
| Temperature, °C | 85 | 85 | 85 | 85 |
| pH (final) | 11.7 | 11.9 | 11.7 | 11.5 |
| Percent O.D. | 12 | 12 | 12 | 12 |
| Analytical Data | | | | |
| R$_{10}$, % | 96.3 | 97.1 | 96.7 | 97.2 |
| S$_{18}$, % | 1.3 | 1.2 | 1.2 | 1.2 |
| Bleached I.V., dl/g | 5.0 | 5.9 | 5.2 | 5.8 |
| ELB, % | 93.7 | 93.7 | 93.5 | 92.9 |
| Brightness Stability Index | | | | |
| (a) Heat-aged | 0.1 | 0.1 | 0.1 | 0.1 |
| (b) Ultraviolet-aged | 0.5 | 0.5 | 0.5 | 0.5 |
| Diacetate | | | | |
| MeCl$_2$:MeOH YI, Hunter | 15.5 | 15.9 | 14.7 | 15.1 |
| Flake Disk +b, Hunter | 0.5 | 0.6 | 0.4 | 0.6 |

The above examples demonstrate the use of peroxide as an additive in an existing extraction stage. However, similar advantageous effects on acetate color characteristics result if a peroxide-mild extraction stage is used to replace an alkaline hypochlorite stage. The following examples demonstrate the use of a peroxide-mild extraction stage in lieu of a hypochlorite stage.

EXAMPLE 5

A sodium base acid sulfite cook of a predominantly western hemlock furnish was bleached by CE°CHD and CE°CE$_P$D sequences for acetate yarn end-use. As shown in Table V, the yellowness index of the diacetate produced in accordance with the invention was reduced. In this example, some small improvement was also obtained in pulp brightness and in ultraviolet stability.

TABLE V

| Sample No. | 1 | 2 |
|---|---|---|
| Bleach Sequence | CE°CHD | CE°CE$_P$D |
| Hypochlorite or Peroxide-Hot Caustic Extraction (0.05% MgSO$_4$ added with H$_2$O$_2$) | | |
| Cl$_2$ consumed, % (O.D. pulp basis) | 0.28 | — |
| H$_2$O$_2$ added, % (O.D. pulp basis) | — | 0.40 |
| H$_2$O$_2$ consumed, % (O.D. pulp basis) | — | 0.08 |
| NaOH added, % (O.D. pulp basis) | 0.3 | 0.8 |
| Time, H:M | 1:45 | 1:45 |
| Temperature, °C. | 40 | 60 |
| pH (Final) | 11.0 | 11.3 |
| Percent O.D. | 12 | 12 |
| Analytical Data | | |
| R$_{10}$, % | 94.8 | 95.0 |
| S$_{18}$, % | 2.9 | 2.8 |
| Bleached I.V., dl/g | 8.9 | 9.7 |
| ELB, % | 93.3 | 94.0 |
| Brightness Stability Index | | |
| (a) Heat-aged | 0.2 | 0.1 |
| (b) Ultraviolet-aged | 0.7 | 0.4 |
| Diacetate | | |
| MeCl$_2$:MeOH YI, Hunter | 19.0 | 17.4 |

EXAMPLE 6

The data given in Table VI show the applicability of the use of hydrogen peroxide under extraction stage conditions as the final stage of a four stage sequence in lieu of an alkaline hypochlorite stage. An ammonia base acid sulfite cook of a mixed black spruce and balsam fir furnish was bleached by DEDH and DEDE$_P$ and by DE$_P$DH and DE$_P$DE$_P$ sequences for use in acetate yarn applications. In each of these pairs of bleaches, stock bleached in common through the first three stages of bleaching was separated into two samples only prior to the final stage of bleaching. The substitution of the final peroxide-extraction stage resulted in a significant 3–4 unit decrease in the methylene chloride:methanol yellowness index for the diacetate dispersion.

TABLE VII

| Sample No. | 1 | 2 | 3 | 4 |
|---|---|---|---|---|
| Bleach Sequence | DEDH | DEDE$_P$ | DE$_P$DH | DE$_P$DE$_P$ |
| K Number | 8 | | | |
| Unbleached I.V., dl/g | 9.8 | | | |
| Hot Caustic Extraction or Peroxide-Hot Caustic Extraction (0.05% MgSO$_4$ added with H$_2$O$_2$) | | | | |
| H$_2$O$_2$ added, % (O.D. pulp basis) | 0.0 | 0.0 | 0.8 | 0.8 |
| H$_2$O$_2$ consumed, % (O.D. pulp basis) | 0.0 | 0.0 | 0.8 | 0.8 |
| NaOH added, % (0.D. pulp basis) | 8.3 | 8.3 | 8.5 | 8.5 |
| Time, H:M | 1:30 | 1:30 | 1:30 | 1:30 |
| Temperature, °C. | 114 | 114 | 114 | 114 |
| pH (Final) | 10.1 | 10.1 | 10.7 | 10.7 |

TABLE VII-continued

| Percent O.D. | 12 | 12 | 12 | 12 |
|---|---|---|---|---|
| Hypochlorite or Peroxide-Hot Caustic Extraction (0.05% MgSO$_4$ added with H$_2$O$_2$) | | | | |
| Cl$_2$ consumed, % (O.D. pulp basis) | 0.10 | — | 0.05 | — |
| H$_2$O$_2$ added, % (O.D. pulp basis) | — | 0.25 | — | 0.25 |
| H$_2$O$_2$ consumed, % (O.D. pulp basis) | — | 0.12 | — | 0.15 |
| Time, H:M | 2:00 | 2:00 | 2:00 | 2:00 |
| Temperature, °C | 25 | 70 | 25 | 70 |
| pH (Final) | 11.8 | 11.1 | 11.8 | 11.2 |
| Percent O.D. | 12 | 12 | 12 | 12 |
| Analytical Data | | | | |
| R$_{10}$, % | 92.7 | 92.7 | 91.4 | 91.3 |
| S$_{18}$, % | 4.6 | 4.6 | 5.2 | 5.2 |
| Bleached I.V., dl/g | 9.0 | 8.8 | 7.9 | 7.7 |
| ELB, % | 94.7 | 95.8 | 95.7 | 96.8 |
| Brightness Stability Index | | | | |
| (a) Heat-aged | 0.1 | 0.1 | 0.1 | 0.1 |
| (b) Ultraviolet-aged | 0.6 | 0.6 | 0.6 | 0.5 |
| Diacetate | | | | |
| MeCl$_2$:MeOH YI, Hunter | 20.4 | 17.4 | 24.8 | 19.4 |

EXAMPLE 7

This example illustrates the replacement of a hypochlorite-hot caustic extraction stage (E$_H$) with a peroxide-mild hot caustic extraction stage. A steam-prehydrolyzed kraft dissolving grade cook of a mixed southern hardwoods furnish was bleached by CE$_H$DED and CE$_P$DED sequences for evaluation in acetate yarn end-use. Although bleached pulp brightness and brightness stability were essentially equivalent, the yellowness index of the MeCl$_2$:MeOH dispersion of the diacetate flake was distinctly lower for the peroxide-extraction bleached sample, as shown in Table VII.

TABLE VII

| Sample No. | 1 | 2 |
|---|---|---|
| Bleach Sequence | CE$_H$DED | CE$_P$DED |
| K Number | 8 | |
| Unbleached I.V., dl/g | 9.0 | |
| Hypochlorite or Peroxide-Hot Caustic Extraction (0.05% MgSO$_4$ added with H$_2$O$_2$) | | |
| Cl$_2$ consumed, % (O.D. pulp basis) | 1.20 | — |
| H$_2$O$_2$ added, % (O.D. pulp basis) | — | 0.36 |
| H$_2$O$_2$ consumed, % (O.D. pulp basis) | — | 0.33 |
| NaOH added, % (O.D. pulp basis) | 3.0 | 2.2 |
| Time, H:M | 0:30 | 0:30 |
| Temperature, °C | 90 | 65 |
| pH (Final) | 11.8 | 12.1 |
| Percent O.D. | 12 | 12 |
| Analytical Data | | |
| R$_{10}$, % | 94.3 | 94.6 |
| S$_{18}$, % | 3.1 | 3.1 |
| Bleached I.V., dl/g | 5.4 | 5.9 |
| ELB, % | 92.8 | 92.7 |
| Brightness Stability Index | | |
| (a) Heat-aged | 0.1 | 0.1 |
| (b) Ultraviolet-aged | 0.7 | 0.9 |
| Diacetate | | |
| MeCl$_2$:MeOH YI, Hunter | 22.3 | 19.0 |

EXAMPLE 8

This example shows the utility of using a peroxide-extraction stage to eliminate a hypochlorite stage which advantageously results in a shortened bleach sequence. A dissolving grade steam prehydrolyzed kraft cook of the southern hardwoods furnish was bleached by six stage CHEDXD and five stage CE$_P$DXD sequences for evaluation in acetate yarn and cigarette filter tow applications. As shown in Table VIII, pulp brightness was barely significantly improved using the CE$_P$DXD sequence while brightness stability was unaltered. However, the methylene chloride methanol yellowness index averaged lower for CE$_P$DXD bleached samples than for CHEDXD bleached samples. Pulp brightness for these four samples also showed poor correlation with improved MeCl$_2$:MeOH yellowness index of the diacetate flake made from these pulp samples via a high catalyst (14% H$_2$SO$_4$ on pulp) acetylation (least squares data fit simple linear regression correlation coefficient r = −0.67 for diacetate MeCl$_2$:MeOH YI as a function of pulp brightness).

TABLE VIII

| Sample No. | 1 | 2 | 3 | 4 |
|---|---|---|---|---|
| Bleach Sequence | CHEDXD | | CE$_P$DXD | |
| K Number | 9 | | | |
| Unbleached I.V., dl/g | 7.7 | | | |
| Hypochlorite | | | | |
| Cl$_2$ consumed, % (O.D. pulp basis) | 0.79 | 0.77 | — | — |
| NaOH added, % (O.D. pulp basis) | 0.7 | 0.7 | — | — |
| Time, H:M | 1:00 | 1:00 | — | — |
| Temperature, °C | 28 | 28 | — | — |
| pH (Final) | 10.9 | 11.2 | — | — |
| Percent O.D. | 8 | 8 | — | — |
| Hot Caustic Extraction or Peroxide-Hot Caustic Extraction (0.05% MgSO$_4$ added with H$_2$O$_2$) | | | | |
| H$_2$O$_2$ added, % (O.D. pulp basis) | 0.0 | 0.0 | 0.5 | 0.5 |
| H$_2$O$_2$ consumed, % (O.D. pulp basis) | 0.0 | 0.0 | 0.5 | 0.5 |
| NaOH added, % (O.D. pulp basis) | 1.5 | 1.5 | 1.8 | 1.6 |
| Time, H:M | 1:15 | 1:15 | 1:15 | 1:15 |
| Temperature, °C | 85 | 85 | 85 | 85 |
| pH (Final) | 11.7 | 11.9 | 11.2 | 11.1 |
| Percent O.D. | 12 | 12 | 12 | 12 |
| Analytical Data | | | | |
| R$_{10}$, % | 96.3 | 97.1 | 96.5 | 97.2 |
| S$_{18}$, % | 1.3 | 1.2 | 1.2 | 1.2 |
| I.V., dl/g | 5.0 | 5.9 | 5.0 | 6.0 |
| ELB, % | 93.7 | 93.7 | 94.0 | 94.1 |
| Brightness Stability Index | | | | |
| (a) Heat-aged | 0.1 | 0.1 | 0.1 | 0.1 |
| (b) Ultraviolet-aged | 0.5 | 0.5 | 0.5 | 0.5 |
| Diacetate | | | | |
| MeCl$_2$:MeOH YI, Hunter | 15.5 | 15.9 | 14.6 | 15.3 |
| Flake Disk +b, Hunter | 0.5 | 0.6 | 0.4 | 0.4 |

EXAMPLES 9 AND 10

The data for mill trial production runs given in Tablex IX and X substantiates the improvement in acetate color properties for acetate made from peroxide-extraction bleached pulp (both primary chlorination and primary mixed chlorine:chlorine dioxide bleach sequences). In addition to the color data obtained on the diacetate flake, color data was also obtained on acetate yarn samples spun from the acetate dope made from some of the bleached samples. The chopped yarn color indicators of +b and yellowness index as read on the Hunter colorimeter were significantly improved for peroxide-extraction bleached pulp although bleached pulp brightness averaged only about 0.5% higher. The data shown for each of the samples in Tables IX and X are the averages of from three to six samples obtained from each mill trial.

TABLE IX

| Sample No. | 1 | 2 |
|---|---|---|
| Bleach Sequence | CHEDXD | CE$_P$DXD |
| Average Analytical Data | | |
| R$_{10}$, % | 97.4 | 98.1 |
| S$_{18}$, % | 1.3 | 1.0 |
| Bleached I.V., dl/g | 7.0 | 7.2 |
| ELB, % | 93.0 | 93.7 |
| Diacetate | | |
| MeCl$_2$:MeOH YI, Hunter | 19.1 | 16.0 |
| Flake Disk +b, Hunter | 1.0 | 0.7 |
| Acetate Chopped Yarn | | |
| Chopped Yarn +b | 4.4 | 3.9 |
| Chopped Yarn YI | 8.1 | 7.0 |

TABLE X

| Sample No. | 1 | 2 |
|---|---|---|
| Bleach Sequence | C$_D$HEDXD | C$_D$E$_P$DXD |
| Average Analytical Data | | |
| R$_{10}$, % | 97.7 | 97.8 |
| S$_{18}$, % | 1.1 | 1.1 |
| Bleached I.V., dl/g | 7.2 | 7.0 |
| ELB, % | 93.6 | 94.3 |
| Diacetate | | |
| MeCl$_2$:MeOH YI, Hunter | 17.7 | 14.9 |
| Flake Disk YI, Hunter | 2.0 | 1.7 |
| Flake Disk +b, Hunter | 1.1 | 0.9 |

EXAMPLES 11 AND 12

The data in Tables XI and XII demonstrate the effect of substituting a peroxide-mild extraction stage for a hypochlorite stage in a primary hot caustic extraction stage sequence. The ammonia base acid sulfite process was used to cook both western hemlock and southern pine chip furnishes. Bleached pulp was evaluated after conversion to cellulose acetate by a low catalyst process for suitability in acetate yarn end-use. Tables XI and XII are a direct comparison of results using substantially the same bleaching sequences on totally different furnishes. In both examples, ammonia base sulfite cooks were used. As shown in both tables, the pulp brightness was increased. However, the yellowness index was dramatically reduced in both examples—a five to six unit reduction. The two tables also demonstrate that improved acetate color is essentially independent of type of furnish as hemlock (Example 11) is a considerably different wood furnish than southern pine (Example 12). Moreover, in Example 11, the peroxide-extraction (E$_p$) stage was used in a shortened four stage bleaching sequence versus a five stage prior art CE°CHD sequence with equivalent acetate color results.

TABLE XI

| Sample No. | 1 | 2 | 3 | 4 |
|---|---|---|---|---|
| Bleach Sequence | E°CHD | E°CE$_P$D | | CE°CHD |
| K Number | 11 | | | |
| Unbleached I.V., dl/g | 10.3 | | | |
| Hypochlorite | | | | |
| Cl$_2$ consumed, % (O.D. pulp basis) | 0.59 | — | — | — |
| Temperature, °C. | 40 | — | — | — |
| Time, H:M | 1:45 | — | — | — |
| pH (Final) | 11.3 | — | — | — |
| Percent O.D. | 16 | — | — | — |
| Peroxide-Hot Caustic Extraction (0.05% MgSO$_4$ added with H$_2$O$_2$) | | | | |
| H$_2$O$_2$ added, % (O.D. pulp basis) | — | 0.80 | 0.50 | — |
| H$_2$O$_2$ consumed, % (O.D. pulp basis) | — | 0.48 | 0.37 | — |
| NaOH added, % (O.D. pulp basis) | — | 0.80 | 1.00$^a$ | — |
| Time, H:M | — | 1:45 | 2:00$^a$ | — |
| Temperature, °C. | — | 64 | 60 | — |
| pH (Final) | — | 9.9 | 11.2$^a$ | — |
| Percent O.D. | — | 16 | 16 | — |
| Analytical Data | | | | |
| R$_{10}$, % | 95.7 | 95.5 | 95.6 | 95.4 |
| S$_{18}$, % | 2.6 | 2.7 | 2.7 | 2.7 |
| Bleached I.V., dl/g | 9.8 | 9.0 | 8.9 | 8.2 |
| ELB, % | 92.7 | 94.7 | 94.8 | 94.0 |
| Brightness Stability Index | | | | |
| (a) Heat-aged | 0.2 | 0.1 | 0.2 | 0.2 |
| (b) Ultraviolet-aged | 0.7 | 0.5 | 0.5 | 0.5 |
| Diacetate | | | | |
| MeCl$_2$:MeOH YI, Hunter | 21.0 | 16.0 | 15.8 | 15.8 |

$^a$0.4% of the NaOH addition was made after 1 hour retention.

TABLE XII

| Sample No. | 1 | 2 | 3 |
|---|---|---|---|
| Bleach Sequence | E°CHD | E°CE$_P$D | E°CE$_P$D |
| K Number | 16 | | |
| Unbleached I.V., dl/g | 12.0 | | |
| Hypochlorite | | | |
| Cl$_2$ consumed, % (O.D. pulp basis) | 0.97 | — | — |
| Temperature, °C. | 35 | — | — |
| Time, H:M | 1:10 | — | — |
| pH (Final) | 11.2 | — | — |
| Percent O.D. 12 | — | — | |
| Hot Caustic Extraction or Peroxide-Extraction (0.05% MgSO$_4$ added with H$_2$O$_2$) | | | |
| H$_2$O$_2$ added, % (O.D. pulp basis) | — | 1.00 | 0.60 |
| H$_2$O$_2$ consumed, % (O.D. pulp basis) | — | 0.56 | 0.45 |
| NaOH added, % (O.D. pulp | | | |

TABLE XII-continued

| basis) | — | 2.00 | 2.00[a] |
|---|---|---|---|
| Time, H:M | — | 1:00 | 2:10[a] |
| Temperature, °C. | — | 65 | 65 |
| pH (Final) | — | 11.6 | 11.7[a] |
| Percent O.D. | — | 12 | 12 |
| Analytical Data | | | |
| $R_{10}$, % | 95.0 | 94.8 | 94.7 |
| $S_{18}$, % | 2.9 | 2.9 | 3.0 |
| Bleached I.V., dl/g | 9.3 | 8.5 | 8.7 |
| ELB, % | 91.7 | 93.6 | 93.4 |
| Brightness Stability Index | | | |
| (a) Heat-aged | 0.5 | 0.2 | 0.2 |
| (b) Ultraviolet-aged | 1.8 | 1.2 | 1.2 |
| Diacetate | | | |
| $MeCl_2$:MeOH YI, Hunter | 19.1 | 13.3 | 13.9 |

[a] Half of the NaOH added at 1 hour retention time.

EXAMPLE 13

An ammonia base acid sulfite cook of southern pine was prepared and subjected to an $ECHDX_H$ control sequence and an $ECE_PDX_H$ experimental sequence. ($X_H$ is a cold caustic extraction stage in the presence of hypochlorite.) An injection molded plastic disk was prepared for this example. The yellowness index of both the diacetate dispersion and the plastic disk was reduced as shown in Table XIII.

TABLE XIII

| Sample No. | 1 | 2 |
|---|---|---|
| Bleach Sequence | $ECHDX_H$ | $ECE_PDX_H$ |
| K Number | 7 | |
| Unbleached I.V., dl/g | 8.0 | |
| Hypochlorite | | |
| $Cl_2$ added, % (O.D. pulp basis) | 1.0 | — |
| $Cl_2$ consumed, % (O.D. pulp basis) | 0.97 | — |
| NaOH added, % (O.D. pulp basis) | 0.9 | — |
| Temperature, °C. | 35 | — |
| Time, H:M | 1:15 | — |
| pH (Final) | 11.6 | — |
| Percent O.D. | 12 | — |
| Hot Caustic Extraction or Peroxide-Hot Caustic Extraction (0.05% $MgSO_4$ added with $H_2O_2$) | | |
| $H_2O_2$ added, % (O.D. pulp basis) | — | 0.80 |
| $H_2O_2$ consumed, % (O.D. pulp basis) | — | 0.48 |
| NaOH added, % (O.D. pulp basis) | — | 1.6 |
| Time, H:M | — | 1:30 |
| Temperature, °C. | — | 65 |
| pH (Final) | — | 11.4 |
| Percent O.D. | — | 12 |
| Analytical Data | | |
| $R_{10}$, % | 96.1 | 95.9 |
| $S_{18}$, % | 1.4 | 1.5 |
| Bleached I.V., dl/g | 7.4 | 7.1 |
| ELB, % | 94.2 | 95.9 |
| Brightness Stability Index | | |
| (a) Heat-aged | 0.2 | 0.1 |
| (b) Ultraviolet-aged | 0.9 | 0.6 |
| Diacetate | | |
| $MeCl_2$:MeOH YI, Hunter | 9.9 | 7.4 |
| Plastics Data | | |
| I.M. YI, Hunter | 20.0 | 16.3 |

EXAMPLE 14

This example shows the results of a number of mill trial production runs on ammonia base sulfite pulp cooked from southern pine furnish. The pulp was subjected to an $EC_DHDX_H$ control sequence and an $EC_DE_PDX_P$ experimental sequence. (The addition of hypochlorite to the X stage in the control was replaced by peroxide in the experimental run because this addition normally is consistent with the third stage.) Table XIV shows that the yellowness index of both the diacetate dispersion and the plastic disk was reduced in the experimental runs, dramatically so in the case of the plastics disk.

TABLE XIV

| Sample No. | 1 | 2 | 3 | 4 | 5 | 6 |
|---|---|---|---|---|---|---|
| Bleach Sequence | $EC_DE_PDX_P$ | | | $EC_DHDX$ H | | |
| Average Analytical Data | | | | | | |
| $R_{10}$, % | 96.8 | 96.3 | — | 96.3 | 96.4 | — |
| $S_{18}$, % | 1.4 | 1.6 | — | 1.6 | 1.5 | — |
| ELB, % | 95.8 | 95.0 | 95.3 | 95.3 | 96.3 | — |
| Diacetate | | | | | | |
| $MeCl_2$:MeOH YI, Hunter | 8.2 | 6.9 | 5.9 | 6.8 | 7.6 | 8.9 |
| Plastics Data | | | | | | |
| I.M. YI, Hunter | 13.1 | 14.4 | 12.2 | 13.0 | 15.4 | 18.0 |

The foregoing data shows that the use of a peroxide-extraction stage in the bleaching sequences illustrated produces significant improvement in acetate quality as measured by the yellowness index of the various samples. The data also demonstrates that this acetate improvement is obtained even though pulp brightness and brightness stability is unaffected or only slightly affected by the use of the same bleaching sequence.

We claim:

1. In a process for producing cellulose acetate from highly purified cellulosic dissolving pulp comprising subjecting the dissolving pulp to a bleaching sequence including at least one alkaline extraction stage and acetylating the bleached pulp to convert the pulp to cellulose acetate,
    the improvement in which the yellowness index of the cellulose acetate is reduced comprising carrying out the alkaline extraction stage in the presence of from 0.2 to 3.3% based on dry pulp weight of a peroxide selected from the group consisting of hydrogen peroxide and sodium peroxide.

2. The process of claim 1 in which the alkaline extraction stage is carried out under the following conditions:

| | |
|---|---|
| Caustic Weight % (based on dry pulp) | 0.3–14 |
| °C. | 50–145 |
| Time (Hrs) | 0.5–2.0 |
| Consistency (% dry pulp of total wt) | 8–16 |
| pH (initial) | 11–13 |
| pH (final) | >10 |

3. The process of claim 1 or 2 in which the bleaching process comprises the following sequential stages: chlorination, peroxide-extraction, chlorine dioxide, cold caustic extraction and chlorine dioxide.

4. The process of claim 3 in which the chlorination stage also contains chlorine dioxide.

5. The process of claim 1 or 2 in which the bleaching process comprises the following sequential steps: extraction, chlorination, extraction, chlorine dioxide and cold caustic extraction.

6. The process of claim 5 in which the chlorination stage includes chlorine dioxide and the cold caustic extraction stage includes peroxide.

7. The process of claim 5 in which the cold caustic extraction stage includes hypochlorite.

* * * * *